United States Patent [19]

Bobinski et al.

[11] 3,770,563

[45] Nov. 6, 1973

[54] WATER-RESISTANT CONSUMABLE CARTRIDGE CASE

[75] Inventors: Jack Bobinski, Mt. Lakes; Jean P. Picard, Morristown, both of N.J.

[73] Assignee: The United States of America as represented by the Secretary of the Army, Washington, D.C.

[22] Filed: Jan. 26, 1971

[21] Appl. No.: 109,952

[52] U.S. Cl. ............... 161/162, 102/38, 102/43 A, 102/43 R, 102/DIG. 1, 161/168, 161/184
[51] Int. Cl. ...... F42b 9/14, F42b 39/02, F42b 5/30
[58] Field of Search .................. 161/162, 168, 184; 260/13; 102/38, 43 P, 43 R, DIG. 1

[56] References Cited
UNITED STATES PATENTS

| | | | |
|---|---|---|---|
| 3,676,233 | 7/1972 | Netzer et al. | 102/DIG. 1 |
| 3,670,649 | 6/1972 | Hartlein et al. | 102/43 R |
| 3,139,355 | 6/1964 | DeFries et al. | 102/43 R |
| 3,513,776 | 5/1970 | Driscoll | 102/43 R |
| 3,280,746 | 10/1966 | Brown | 102/43 P |
| 2,137,350 | 11/1938 | Roberts | 102/43 P |
| 3,047,524 | 7/1962 | Bowman | 260/13 |
| 1,880,808 | 10/1932 | Clarke et al. | 260/225 |
| 3,257,948 | 6/1966 | Axelrod et al. | 102/DIG. 1 |
| 3,542,740 | 11/1970 | Pumpelly et al. | 260/13 |
| 2,879,235 | 3/1959 | Condo | 260/13 |
| 2,865,870 | 12/1958 | Pinder | 260/13 |
| 601,902 | 4/1898 | Oliver | 102/DIG. 1 |
| 3,397,637 | 8/1968 | Bobinski et al. | 102/38 |
| 3,504,630 | 4/1970 | Picard | 102/43 R |

*Primary Examiner*—William J. Van Balen
*Attorney*—Harry M. Saragovitz, Edward J. Kelly, Herbert Berl and A. Victor Erkkila

[57] ABSTRACT

Novel water-resistant consumable cartridge cases are made from fibrous organic derivatives of cellulose, e.g., cellulose stearate acetate mixed ester, which absorb less than about 6 percent by weight of moisture. The cartridge cases are produced by compression molding a plastic mixture of the particulate fibrous cellulose derivative and a polymerizable composition capable of forming a rigid, cross-linked water insoluble polyurethane or other resin, and thereafter forming the resin.

7 Claims, No Drawings

WATER-RESISTANT CONSUMABLE CARTRIDGE CASE

The present invention relates to novel water-resistant consumable cartridge casing material and to methods for making same.

Non-metallic, consumable cartridge cases prepared from cellulose are generally unsatisfactory due to the tendency of the cellulose to absorb moisture from the atmosphere, causing it to soften and swell and render the case weak and unfit for use. To overcome this difficulty various treatments designed to waterproof the case have been proposed, such as coating the case with a water-insoluble wax or lacquer, or impregnating the porous cellulosic casing material with a solution of a water-insoluble resin followed by heating to evaporate the solvent and cure the resin. Another method is to place the cellulosic cartridge case containing propellant charge in a sealed bag made of film of hydrophobic organic resin such as polyethylene. None of the prior art methods or compositions have proved entirely satisfactory.

An object of this invention is to provide a novel consumable cartridge case material of high water resistance combined with good strength.

Another object of the invention is to provide a process for producing such novel consumable cartridge case material, which is simple, safe and eliminates the need for special water-proofing treatments.

Other objects of the invention will appear or be obvious from the description of the invention set forth below.

Our investigations have revealed that certain organic derivatives of cellulose of fibrous nature possess very low moisture absorption properties. Our studies have further shown that such fibrous organic derivatives of cellulose, by virtue of their extremely low hygroscopic-practically hydrophobic- properties and their fibrous, porous nature, are uniquely suited for producing highly water-resistant cartridge cases, which possess sufficient porosity to permit complete combustion thereof when fired with a suitable propellant.

Thus, in accordance with this invention such novel consumable cartridge cases can be obtained by compressing a homogeneous plastic mixture consisting essentially of 1. particles of a fibrous organic derivative of cellulose of low hygoscopicity, i. e., which absorb less than about 6 percent by weight of water at equilibrium in 90 percent relative humidity at 25° C, and
2. a polymerizable composition capable of forming a rigid, cross-linked, water-insoluble resin, into a suitable shape and thereafter curing the resin. The resulting product contains the particles of fibrous organic cellulose derivative embedded in and/or bonded together by the water-insoluble organic resin into a rigid, porous structure possessing excellent resistance to water combined with good strength and dimensional stability.

A suitable method for making the novel cartridge cases comprises first mechanically mixing the fibrous cellulose derivative with the polymerizable resin composition until a homogeneous plastic mixture is obtained, then compressing the mixture into a suitable shape, e.g., tube or case, by extrusion molding or compression in a mold, and finally heating the product to cure the resin. When a liquid polymerizable resin composition is employed, it can be mixed directly with the organic cellulose derivative, which is usually in the form of a powder or particles less than about one-sixteenth inch in their longest dimension. If the polymerizable resin composition is a solid, it can first be dissolved in a solvent which does not dissolve the organic cellulose derivative, and the resulting solution then mixed with the particulate cellulose derivative to provide a plastic mixture suitable for molding. By judicious selection of molding conditions, proportion of resin employed with the fibrous cellulosic derivative, degree of porosity produced etc., a cartridge case can be obtained which is completely consumable when charged and fired with a propellant.

Organic derivatives of cellulose which can be employed in this invention include organic carboxylic acid esters of cellulose, particularly cellulose esters of hydrocarbon monocarboxylic acids containing at least 6 carbon atoms, such as caproic-, lauric-, stearic-, oleic- and linoleic acids. Such cellulose esters can be obtained by reacting cellulose, such as cotton fiber or bleached sulfite wood pulp, or a cellulose derivative such as cellulose mono- or diacetate, with a suitable carboxylic acid, such as stearic acid, alone or in mixture with another carboxylic acid such as acetic acid, in the presence of an organic solvent for the carboxylic acid and a catalyst for the reaction e.g., trifluoracetic anhydride. The cellulose ester thus obtained can be precipitated by diluting the reaction mixture with methanol. The precipitated product can be purified by dissolving it in a water-miscible solvent such as tetrahydrofuran and pouring the resulting solution into water, whereby a fibrous product is obtained as a precipitate which can be separated by filtration, washed with water and dried. The preparation of such cellulose esters and mixed esters is illustrated in example 1 below and is further described in the prior art, e.g., U.S. Pat. No. 1,880,808.

The following illustrate additional cellulose esters which are suitable for use in this invention: The degree of substitution (DS) is shown in parentheses.

1. cellulose acetate (2.45) oleate (0.19) stearate (0.22) - water absorption = 2.0 percent
2. cellulose acetate (2.4) stearate (0.2) - water absorption = 3.4 percent
3. cellulose crotonate (2.9) - water absorption = 5.4 percent
4. cellulose stearate (0.4) crotonate (0.1) - water absorption = 4.1 percent
5. cellulose acetate (2.4) acid phthalate (0.1) - water absorption = 3.6 percent All of the foregoing cellulose esters absorb less than 6 percent by weight of moisture in 90 percent relative humidity at 25° C (equilibrium condition). Fibrous organic derivatives of cellulose which absorb substantially more than about 6 percent by weight of moisture under such conditions are generally unsatisfactory for use in this invention as they produce cartridge cases, which on exposure to the atmosphere absorb unduly large amounts of moisture and cause the case to swell excessively, and may not be combustible.

For bonding the organic cellulose derivative particles according to this invention any polymerizable composition may be employed, which is capable of producing a water-insoluble, rigid organic resin, such as for example cross-linked polyurethane, epoxy and polyester resins.

Suitable rigid polyurethane resins can be obtained in known manner, for example, by reacting an organic polyisocyanate and an organic polyol in the presence of a cross-linking agent, e.g., a compound containing three or more functional groups, e.g., NCO, OH, and $NH_2$ groups, (which may be provided by the organic polyisocyanate, polyol or another organic compound) to produce a rigid cross-linked resin. Illustrative organic polyisocyanates are toluene- 2,4- diisocyanate, 4,4'- diphenylmethane diisocyanate, polymethylene polyphenylisocyanates obtained by phosgenating polyamines containing more than 2 primary amino groups produced by condensation of aniline with formaldehyde, and prepolymers containing two or more terminal isocyanate groups, e.g., the di- and triisocyanates obtained by reacting one mol of a diol or triol with two and three mols of toluene diisocyanate resp. Illustrative polyols include ethylene glycol, glycerol, 1,2,6- hexanetriol, pentaerythritol and polyether polyols obtained by reacting such polyols with ethylene- and 1,2- propylene oxides, polyester polyols obtained by reacting a polycarboxylic acid e.g., adipic and succinic acids, with an organic polyol e.g., ethylene glycol and polyethylene glycols, etc. A suitable catalyst may be added to accelerate the reaction as is well known, e.g., stannous octoate, triethylene diamine and phenyl mercuric acetate.

Suitable epoxy resins can be prepared, for example, by heating a polyglycidyl ether obtained by reaction of epichlorohydrin with a polyhydric phenol, e.g., 4,4'- dihydroxydiphenyl methane and novolac resins, with a cross-linking agent, e.g., an organic polyamine e.g., m-phenylenediamine or a polycarboxylic acid or anhydride e.g., phthalic-, tetrahydrophthalic- and dodecenyl succinic anhydride, in the presence of a catalyst, e.g., dimethylbenzylamine. Polyester resins which can be employed in this invention include those obtained in known manner by reacting an unsaturated polyester, e.g., polyethylene maleate or -fumarate, with a suitable cross-linking agent, such as styrene.

The preferred resins for use in this invention are epoxy resins obtained by reacting a polyglycidyl ether from epichlorohydrin and 2,2'-bis (4-hydroxyphenyl) propane with an organic polyamine, since they provide excellent curing properties and produce cartridge cases of optimum physical properties.

A degree of porosity ranging from about 30 percent to about 70 percent is usually satisfactory (percent porosity, as usually determined, represents the ratio of the bulk density to the intrinsic density of the case). Generally, an amount of the water-insoluble resin binder from about 30 to about 70 percent, based on the combined weight of the resin binder and organic cellulose derivative, is satisfactory. Smaller proportions of the resin binder, e.g., as low as about 20 percent by weight, can be employed, although the strength of the case generally decreases as the proportion of resin binder is thus reduced.

The following examples illustrate the invention.

Example 1

A uniform mixture of the following materials was placed in a mold:
1. 15 grams of fibrous cellulose acetate linoleate stearate, prepared as described below and containing 2.4 acetate groups, 0.2 linoleate group and 0.2 stearate group per anhydroglucose residue.
2. 15 grams of an epoxy resin of mol. wt. 380, obtained by reacting 2,2-bis (4- hydroxyphenyl) propane with epichlorohydrin (a commercial product known as Epon Resin 828 marketed by Shell Chemical Co.)
3. 15 grams of a polyamide containing free amino groups obtained by reaction of ethylenediamine and linoleic acid dimer (a commercial product known as Versamid 125 supplied by Stephenson Chemical Co. Inc.)
4. 25 ml. of methanol The mold comprised a vertical cylindrical tube of 1 ½ in. I.D. closed at its lower end, and a cylindrical piston of 1 ¼ in. O.D. adapted to move downwardly in the tube in concentric alignment. The piston was then forced into the tube, thereby compressing the mixture and causing it to rise into the annular space between the piston and inner tube wall. The mold was then opened and the tubular case, about 5 in. long, 1 ½ in. I.D. and ⅛ in. wall thickness formed thereby, was removed and maintained first at room temperature for several hours and thereafter at 70° C for 2 hours to cure the epoxy resin.

The cartridge case thus obtained possessed the following properties:

| | |
|---|---|
| moisture absorption (equilibrium conditions at 90% relative humidity at 25°C) | 2.6% by wt. |
| tensile strength | 970 psi |
| elongation | 3.4% |
| porosity | 44% | combustibility — completely combustible, left no residue when fired with conventional propellant at 16,000 psi.

The cellulose acetate linoleate stearate employed in the example was prepared as follows:
A mixture of
80 grams of commercial cellulose acetate (degree of substitution - DS 2.45, i. e., 2.45 acetate groups per anhydroglucose residue)
80 grams of linoleic aci
80 grams of stearic acid
160 ml. of trifluoroacetic anhydride
400 ml. of ethylene dichloride
was heated to 60° C with agitation for 1 ½ hours, then allowed to cool to about room temperature and slowly stirred into 2,500 ml. of methanol. The resulting precipitate was separated by filtration, washed with methanol and air dried. The product thus obtained was purified by dissolving it in tetrahydrofuran, and pouring the resulting solution slowly into a large volume of water to precipitate the product as a white fibrous material, which was isolated by filtration and dried.

Example 2

In the same manner as described in example 1 and using various amounts of the same epoxy resin-polyamide binder, five cartridge cases were prepared from fibrous cellulose stearate oleate mixed ester containing 0.31 stearate and 0.25 oleate groups per anhydroglucose unit.

The cartridge cases thus obtained possessed the following properties:

| | |
|---|---|
| epoxy resin-polyamide content | 47 to 57% by wt. |
| porosity | 35 to 70% |
| tensile strength | 940–980 psi |
| elongation | 3.5% approximately |
| moisture absorption (equilibrium conditions at 90% relative humidity at 24°C) | 2.5% | combustibility - left no residue when fired with a conventional propellant at 16,000 psi.

Prolonged contact of the cases with water had a negligible effect on their rigidity and dimensional stability.

The cellulose stearate oleate employed above was obtained as follows:

A mixture of
20 g. Kraft pulp
20 g. stearic acid
20 g. oleic acid
40 ml. trifluoroacetic anhydride, and
400 ml. ethylene dichloride was heated to boiling and refluxed with agitation for 6 hours. The reaction mixture was then allowed to cool and filtered, and the filter cake of fibrous mixed cellulose ester was purified by washing with methylene chloride and dried.

EXample 3

A. Preparation of the Organic Derivative of Cellulose

A solution of
80 grams of cellulose acetate hydrogen phthalate containing 1.2 acetate and 0.8 phthalate groups per anhydroglucose residue (obtained by refluxing a mixture of cotton linters, acetic acid, phthalic acid, trifluoroacetic anhydride and tetrahydrofuran and thereafter pouring the reaction mixture into water to precipitate the cellulose acetate phthalate mixed ester)
64 grams of an isocyanate terminated polyester containing 6.5 percent by wt. free - NCO group and of m. p. 42°–47° C., marketed as Multrathane F-242 by the Mobay Chemical Co., and
0.4 gram stannous octoate in 1,800 ml. of tetrahydrofuran was heated to boiling and refluxed under ordinary pressure for three hours. The reaction mixture was then cooled to room temperature and slowly poured into 4,000 ml. of water with agitation.

The fibrous precipitate thus obtained was washed with water and then reduced to fibers of about 1/32 in. length (average) in a Waring blender and dried. The dry cellulose derivative thus obtained absorbed 4.8 percent by weight of moisture at 90 percent rel. humidity and 24° C. at equilibrium condition. (It contained free hydroxy groups but no free carboxyl groups by infra red analysis)

B. Preparation of the Non-hygroscopic, Consumable Cartridge Case 100 grams of the cellulose derivative obtained in part A above
100 grams of Multrathane F-242
2.4 grams of 1,4-butanediol
3.6 grams of diethyleneglycol
0.5 gram of stannous octoate
350 grams of ethylenedichloride were mechanically blended and the uniform mixture thus obtained was extrusion molded to form a sleeve, which was then heated to about 120° C for about 6 hours to polymerize and cure the polyurethane resin.

The product thus obtained possessed the following properties:

| | |
|---|---|
| tensile strength | 1720 psi. |
| elongation | 6.7% |
| combustibility | completely combustible in an erosion apparatus at 16,000 psi. when fired with a conventional propellant |

From the foregoing it can be seen that the invention provides a number of valuable and unobvious advantages over the prior art. Thus, it utilizes essentially non-hygroscopic fibrous organic derivatives of cellulose as a novel class of materials for manufacturing consumable cartridge cases. The novel use of such cellulose derivatives according to this invention avoids the hazards associated with the application of elevated curing temperatures and molding and extrusion pressures in the manufacture of consumable cases from potentially explosive materials, such as nitrocellulose previously employed. Also, nitrocellulose is undesirable for making consumable cartridge cases, since it gradually decomposes on exposure to air and light. Further, the novel cartridge cases can be readily prepared simply by compressing a mixture of such particulate cellulose derivative and polymerizable resin composition into a desired shape and then forming the polymerized resin. The method is simple and safe. The novel consumable cartridge cases of this invention, unlike cases previously prepared with cellulose fibers, do not absorb water or swell and become unusable; and unlike cases prepared from nitrocellulose, they can be inserted into the chamber of a cannon etc. hot from previous firings, without danger of premature explosion or fire. Also, by virtue of the fibrous, porous structure of the organic cellulose derivative, the novel cartridge cases prepared therewith according to this invention can be provided with sufficient porosity to permit of their complete combustion under firing conditions.

We claim:

1. A consumable cartridge case of good water resistance and dimensional stability, consisting essentially of particles of a fibrous cellulose ester of a carboxylic acid, which absorb less than 6 percent by weight of water, bonded together into a porous structure with a water-insoluble, rigid, cross-linked organic resin selected from the group consisting of epoxy and polyurethane resins, said case having a porosity between about 30 percent and about 70 percent and containing from about 30 percent to about 70 percent of said organic resin based on the combined weight of said resin and said cellulose ester.

2. The case according to claim 1 wherein the resin is an epoxy resin obtained by reacting a polyglycidyl ether, produced by reaction of epichlorohydrin with 2,2-bis (4-hydroxyphenyl) propane, with a polyamine cross-linking agent.

3. The case according to claim 2 wherein the cellulose ester is selected from the group consisting of cellulose acetate stearate, cellulose acetate stearate oleate, cellulose acetate phthalate, cellulose stearate oleate, cellulose acetate linoleate stearate and cellulose stearate crotonate.

4. The case according to claim 2 wherein the polyamine cross-linking agent is a polyamide containing free amino groups obtainable by reacting ethylenediamine and linoleic acid dimer.

5. The case according to claim 2, which exhibits a water absorption not greater than about 2.5 percent at 90 percent relative humidity at 24° C.

6. The case according to claim 4, wherein the cellulose ester is a cellulose stearate oleate mixed ester and the case possesses a content of 47–57 percent of said epoxy-polyamide resin, a porosity of 35–70 percent, a moisture absorption of not more than about 2.5 percent at 90 percent relative humidity at 24° C, a tensile strength of 940–980 psi and an elongation of about 3.5 percent.

7. The case according to claim 1, wherein the carboxylic acid comprises a hydrocarbon monocarboxylic acid containing at least 6 carbon atoms.

* * * * *